(12) United States Patent
Swinford-Meyer et al.

(10) Patent No.: US 7,637,362 B2
(45) Date of Patent: Dec. 29, 2009

(54) CLUTCH UNIT

(75) Inventors: Chris Swinford-Meyer, Port Elizabeth (ZA); Suresh Krishnaswamy, Bangalore (IN); Padmanaban Radhakrishnan, Tamil Nadu (IN); Patrick Weydmann, Buehl (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 0 days.

(21) Appl. No.: 11/888,999

(22) Filed: Aug. 3, 2007

(65) Prior Publication Data
US 2008/0078642 A1    Apr. 3, 2008

Related U.S. Application Data

(63) Continuation of application No. PCT/DE2006/000166, filed on Feb. 3, 2006.

(51) Int. Cl.
*F16D 21/06*    (2006.01)
*F16D 13/48*    (2006.01)

(52) U.S. Cl. .................. 192/48.8; 192/70.3; 192/89.22; 192/99 A

(58) Field of Classification Search ................ 192/48.8, 192/89.22
See application file for complete search history.

(56) References Cited

U.S. PATENT DOCUMENTS

| | | | |
|---|---|---|---|
| 2,875,873 A * | 3/1959 | Rugen | ........................ 192/48.8 |
| 3,760,918 A | 9/1973 | Wetrich et al. | |
| 4,465,170 A | 8/1984 | Marchisio | |
| 5,513,734 A | 5/1996 | Scotti | |

FOREIGN PATENT DOCUMENTS

EP        0 695 885 A1    11/1995

* cited by examiner

*Primary Examiner*—Rodney H Bonck
(74) *Attorney, Agent, or Firm*—Davidson, Davidson & Kappel, LLC

(57) ABSTRACT

A clutch unit including a housing fixed to a flywheel, in which two axially displaceable pressure plates are housed fixed to the housing to form a first and a second clutch, each provided with a clutch disk, whereby the clutches may be independently operated by means of lever arrangements, mounted to pivot on the housing, whereby each lever arrangement is connected to a pressure plate for opening and closing the corresponding clutch.

7 Claims, 2 Drawing Sheets

CLUTCH UNIT

This application is a continuation of prior International Application PCT/DE2006/001666, filed Feb. 3, 2006.

The invention relates to a clutch unit with a housing, which can be mounted to a flywheel, in which housing two press plates are received torque proof, relative to the housing, but axially displaceable, in order to form a first and a second clutch, a respective clutch disk is associated with each press plate, wherein the clutches can be operated independently from each other through lever arrangements, pivotably supported at the housing, wherein the lever arrangements are coupled to the respective press plates for opening and closing the respective clutches.

BACKGROUND

Such clutch units, which are also called twin clutches, have become state of the art, e.g. through U.S. Pat. No. 3,760,918, U.S. Pat. No. 5,513,734, or U.S. Pat. No. 4,465,170.

Such clutch units are being used in agricultural tractors or agricultural machinery among other applications. Thus one of the clutches is used for driving operations, and the other clutch is used for turning an additional drive on and off, through which additional equipment can be driven. Such additional equipment can be e.g. pumps, equipment to work the soil, harvesting equipment, or processing equipment for the harvested material.

SUMMARY OF THE INVENTION

In accordance with an embodiment of the present invention, the present invention provides clutch units of the kind mentioned above, which are very reliable, and which are simple and compact in construction.

In accordance with various embodiments of the present invention, this may be accomplished by the first clutch facing the flywheel being locked in non actuated state through a disk spring, compressed between its press plate and the housing, which is located axially between the actually adjacent press plates, whereas the second clutch provided on the side of the first clutch, facing away from the flywheel, is open in non actuated state, and forced locked through a force, transferred into the clutch unit from the outside, through its lever arrangement, wherein the lever arrangement of the second clutch is coupled with the associated press plate via axially operating pull elements, and between these pull elements and this press plate, at least one spring element is compressed, which has a predetermined preload, when the second friction clutch is opened, and which goes through an additional elastic deformation when this second clutch is closed.

The almost axially adjacent arrangement of the two press plates allows a compact design, at least in axial direction, which is particularly due to the fact that only the disk spring may be disposed between the two said press plates. Furthermore, such a design of the clutch unit allows an axial overlap of areas of the press plates.

An additional advantage of the designed clutch unit may be that the clutch, which is forced closed, may be used for additionally driving ancillary equipment, so that in case of a failure of the operating system, forcing the clutch closed, the clutch can open independently. Thereby, driving the ancillary equipment, examples for which have already been discussed, may be interrupted. The vehicle equipped with the clutch unit, however, may still be driven. Through the actual automatic decoupling of the power takeoff drive, a high level of operational safety is provided, since the engine driving the clutch unit does not have to be turned off.

The minimum torque, which may be transferable by the second clutch, is determined through the preload of the at least one spring element.

In accordance with certain embodiments of the present invention the layout of the clutch unit may be such that the levers of the first clutch are coupled with the respective press plate through pull elements. The layout of the clutch unit may thus be provided, so that the levers of both lever arrangements form levers with two arms. These two arm levers may thus be coupled through a respective radial external area with their associated pull elements through a respective joint. Radially within this joint, the levers may be pivotably supported at the housing. The radially interior areas of the levers may be actuated by an actuating system, which may be provided as a hydraulic, electric, or numeric system. The operating systems, however, may be comprised of a combination of various actuating systems, thus e.g. they may be provided electro-hydraulic, electro-pneumatic or hydro-pneumatic, etc.

The at least one spring element, compressed between the pull elements and the press plate of the second clutch, may e.g. be formed by a component provided as a disk spring. Such a component may thus be designed, so that the force, generated by it, remains substantially constant, also over the additional elastic deformation, effected during the closing of the second clutch. In an advantageous manner, however, several coil springs may be used for forming a resulting spring element, at least one of which may be disposed between a respective pull element and the associated pressure plate. Such a preloaded coil spring is axially supported, on the one hand, at the pressure plate, and, on the other hand, at a pull element. The spring element or the coil springs may be thus disposed on the side of the associated press plate, facing away from the levers of the second clutch.

When closing the second clutch, its pull elements may be axially displaced relative to the respective pressure plate by a limited amount against the effect of the coil springs.

In accordance with certain embodiments of the present invention, the layout of the clutch unit may be such that, when the pull elements of the second clutch have an axial stop on the side of the associated press plate, facing away from the compressed spring element or the coil springs, the stop interacting with this pressure plate and limiting the unloading of the spring element, or the coil springs, when opening the second friction clutch.

BRIEF DESCRIPTION OF THE DRAWINGS

Further useful design- and functional features of a clutch unit, according to the invention, are described now with reference to the following figures.

It is shown in.

DETAILED DESCRIPTION

Figure 1:
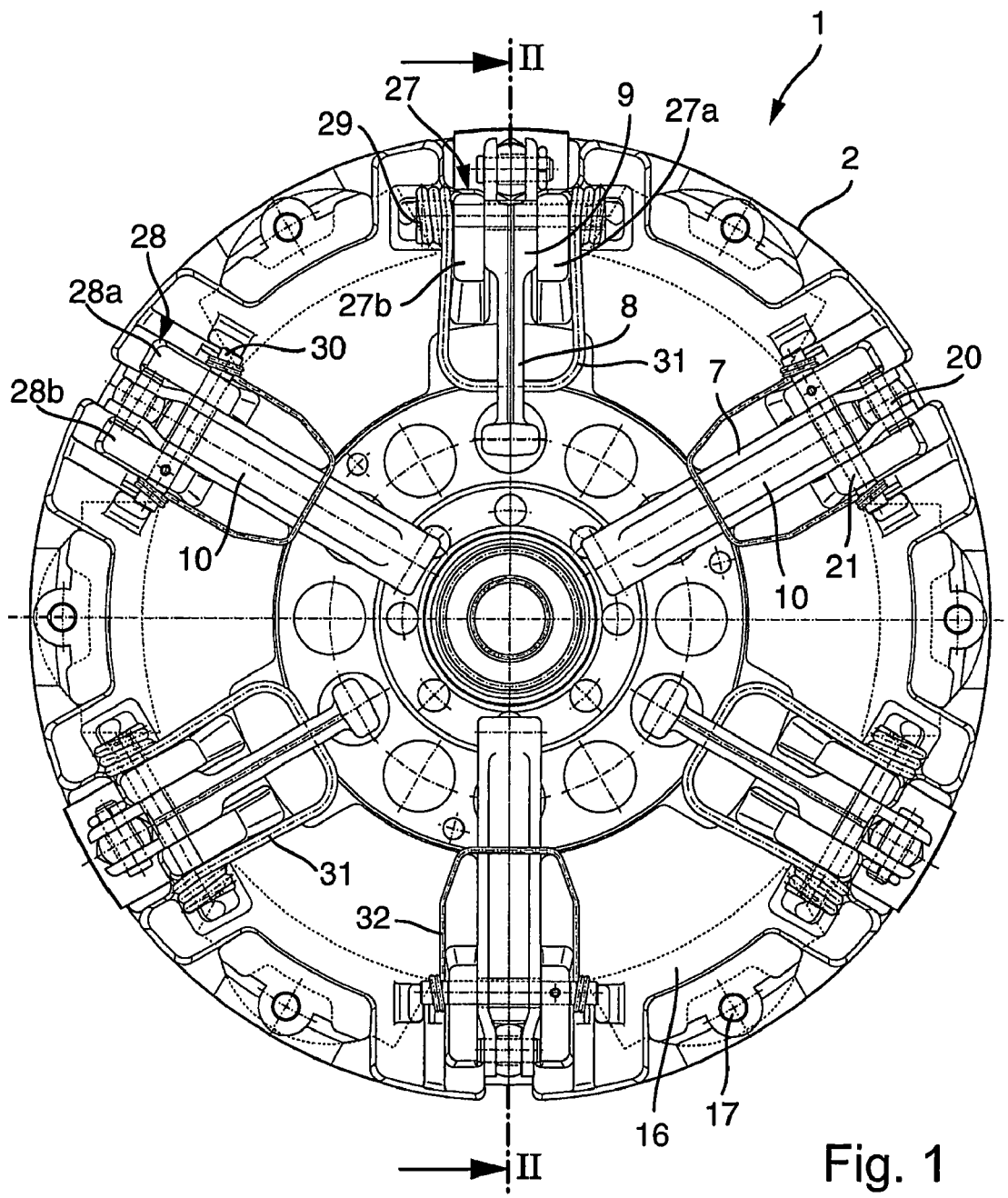
FIG. 1 a plan view of a clutch unit.
Figure 2:
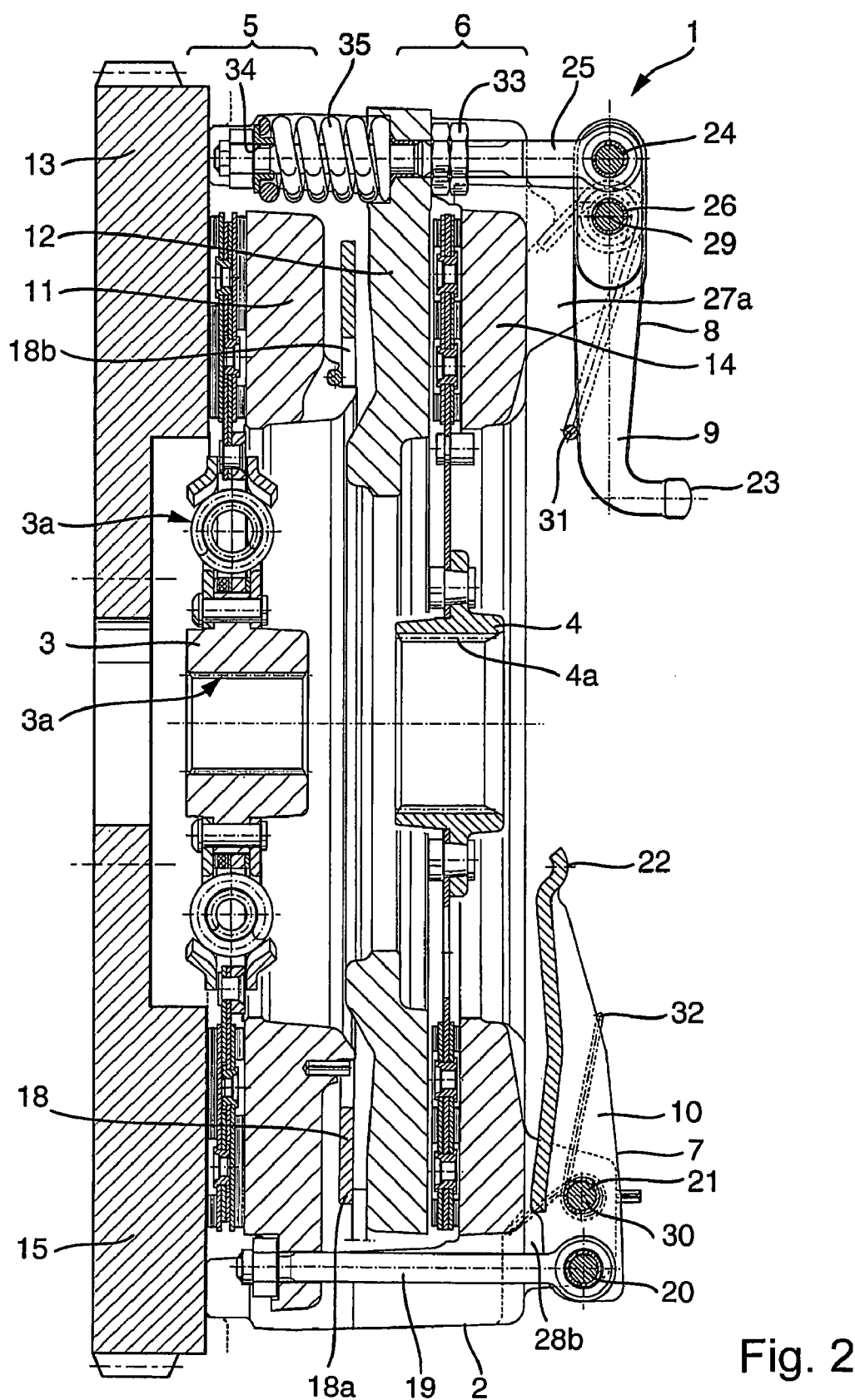
FIG. 2 a sectional view, along the line II-II of FIG. 1.

The clutch unit 1, shown in FIGS. 1 and 2, forms a so-called twin clutch 2, comprising two clutch disks 3 and 4, which can be connected with different shafts, which are to be driven, and thus, through an internal hub teething $3a$, $4a$. The clutch unit 1 comprises a first clutch 5 and a second clutch 6, which can be operated independently from each other, through a first lever arrangement 7, and a second lever arrangement 8. As can be seen from FIG. 1, each lever arrangement 7 and 8 in the shown embodiment comprises three levers 9 and 10. The levers 10 are provided as shaped sheet metal parts, whereas the levers 9 are provided as forged or cast parts. From FIG. 1, it is evident, that the levers 9 and 10 are disposed in an alternating manner in circumferential direction.

As can be seen from FIG. 2, the clutches 5 and 6 each have a press plate 11 or 12, which can be axially moved relative to an opposite press plate 13 or 14, through the associated levers 10 or 9, for opening and closing the clutches 5 and 6. Through moving the press plates 11 and 12, the friction liners of the clutch disks 3 and 4 are either unloaded, or clamped for torque transfer between the friction surfaces of their respectively associated press plates 11, 12, and the opposite press plates 13 and 14. The two press plates 11 and 12 are axially adjacent.

In the shown embodiment, the opposite press plate 13 of the friction clutch 5 is formed by a flywheel 15, which can be connected with the output shaft of an engine. The opposite press plate 14 is directly formed through a housing 16, which can be connected with the flywheel 15, and thus preferably through threaded connections. Therefore, the housing 16 has several axial threaded openings 17, distributed over the circumference, which are visible in FIG. 1.

As becomes apparent from FIG. 2, the two press plates 11 and 12 are axially received in the housing 16, and the press plate 11 is axially loaded in closed position by the energy storage disposed axially between the press plates, provided as a disk spring 18. The clutch 5 is thus closed in non actuated state. Hereby, the clutch spring 18 is supported in the shown embodiment, through its outer rim 18a at the housing 16, and axially loads the press plate 11 with its radial inner areas 18b in the direction of the opposite press plate 13. The axial dislocation of the press plate 11 is performed via the levers 10, which are operably connected to the press plate 11 through a respective pull element, formed as a pull rod 19. The pull rod 19 has a pivot bearing 20, relative to the associated lever 10. The lever 10 is radially supported within this pivot bearing 20, at the housing 16, through a pivot bearing 21. On the radial inside, the levers 10 form loading areas 22 for an actuation element, as e.g. a so-called lay out bearing, or operating bearing. Due to this arrangement, these levers 10 each form a so-called two-arm lever, wherein the one lever arm is formed by the radial distance between the pivot axes of the pivot bearings 20 and 21, and the second lever arm is formed through the radial distance of the operating areas 22 relative to the axle of the pivot bearing 21. For opening the friction clutch 5, the actuating areas 22 are actuated to the left, whereby the press plate 11 is pulled into the other axial direction via the pull rods 19, thus to the right.

As can be seen from FIG. 2, the levers 9 also each have an operating area 23 on the radial inside, a pivot support 24 on the radial outside for a pull element 25, as well as, a pivot bearing 26 provided radially in between, which is carried by the housing 16. Thus the levers 9 form so-called two-arm levers, similar to the levers 10.

For forming the pivot joints 21 and 26, the housing 16 has so-called bearing supports 27, 28, which are visible in FIG. 1. In the shown embodiment, the bearing supports 27 and 28 are formed by two respective axially protruding housing walls or housing cams 27a, 27b or 28a, 28b, which are offset in parallel to each other, and receive one respective lever 9 or 10 between each other. The bearing cams 27a, 27b, 28a, 28b, and the respectively associated levers 9 and 10 have indentations for receiving a pivot axis 29 or 30.

Between the levers 9, 10 and the housing 16, hairpin springs or spring clips 31, 32 are compressed, which force the levers 9, 10 into a defined position.

The pull elements 25, which are also formed by pull rods, have an axial support 33, which is formed here by two adjustable nuts. The stop 33 is disposed on the side of the press plate 12, facing the opposite press plate 14. On the side of the press plate 12, facing away from the stop 33, the pull elements 25 have a second stop or a support 34, which also comprises a nut in the shown embodiment. Between a second stop 34 and the press plate 12 an energy storage is clamped, which is formed here respectively through at least one coil spring 35. The second clutch 6, due to the nature of its kinematical design, is open when the levers 9 are not actuated. Thus, this means that this second clutch 6 is forced closed through a force transferred into the clutch 6 through the actuation areas 23. In the open state of the second clutch 6, the preload force of the springs 35, which is set to a predetermined value, is received by the stops 33, whereby the defined position, illustrated in FIG. 2, between the particular components of the second clutch 6, is assured. For closing the second clutch 6, the actuation areas 23 are actuated towards the left, whereby the levers 9 are pivoted around the pivot supports 26, so that the press plate 12 is pulled to the right via the pull rods 25. As soon as the friction liners of the clutch disk 4 are clamped between the friction surfaces 12 of the press plate, and the opposite press plate 14, and the operating areas 23 are furthermore displaced to the left by a certain amount, also the coil springs 35 are compressed between the second stop 34 and the pressure plate 12. This is due to the fact that the pull rods 25 are pulled to the right by the levers 9. The closing force of the second clutch 6 is thereby determined by the preload and the additional, comparatively small, compression of the springs 35, which is additionally effected, when the clutch 6 is being closed.

The clutch unit 1 is constructed, so that the first clutch 5 forms the said drive clutch, through which the vehicle is moved. The first clutch 5 thus serves for shifting the gears of the drive transmission. It is evident from FIG. 2, that the clutch disk 3 has at least one rotation oscillation damper 3a.

The second clutch 6 serves e.g. in tractors or multipurpose vehicles for driving auxiliary equipment, as e.g. pumps, harvesting, and/or ground working equipment etc. The clutch disk 4 in the shown embodiment is provided as so-called rigid clutch disk, thus without a damper.

The embodiments are not to be perceived as restrictions of the invention. Furthermore, in the context of the present embodiment, various variations or modifications are possible; in particular, such variations, which can be formed through combinations or changes, of features, or elements, or process steps, which are included in the general description, and in the description of the figures, and which are described in the claims and included in the drawings.

DESIGNATIONS

1 Clutch unit
2 Twin clutch
3 Clutch disk
3a Inner teething of hub
4 Clutch disk
4a Inner teething of hub
5 First clutch
6 Second clutch
7 First lever arrangement
8 Second lever arrangement
9 Lever
10 Lever
11 Press plate
12 Press plate
13 Opposite press plate
14 Opposite press plate 15 Flywheel
16 Housing
17 Axial threaded openings
18 Disk spring
18a Disk spring outer rim
18b Disk spring radial inner area
19 Pull rod
20 Pivot support
21 Pivot support
22 Actuation area
23 Actuation area
24 Pivot support
25 Pull element
26 Pivot support
27 Bearing support
27a Protruding housing lobes
27b Protruding housing lobes
28 Bearing support
28a Protruding housing lobes
28b Protruding housing lobes
29 Pivot axis
30 Pivot axis
31 Spring clip
32 Spring clip
33 Axial stop
34 Second stop or support
35 Coil spring

What is claimed is:

1. A clutch unit with a housing, the clutch unit being mountable to a flywheel and the clutch unit comprising:
a first press plate and a second press plate being received in the clutch unit, the first and second press plates being torque proof relative to the housing, the first and second press plates being axially moveable;
a first lever arrangement and a second lever arrangement;
the first and second press plates, respectively, forming a first clutch and a second clutch with a clutch disk associated with each of the first and second press plates, the first and second clutches being operable independently from each other through the first and second lever arrangements, respectively;
the first and second lever arrangements being pivotably supported at the housing, each of the lever arrangements coupled with the respective first or second press plates for opening and closing the respective first or second clutch;
the first clutch facing the flywheel being closed in a non actuated state through a disk spring, the disk spring being compressed between the first press plate and the housing, the disk spring being axially disposed between adjacent first and second press plates, wherein the second clutch, being on the side of the first clutch facing away from the flywheel being open in a non-actuated state and is forced closed when a force is applied on the second lever arrangement;
an axially operating pull element connected with the second lever arrangement, the second lever arrangement of the second clutch being coupled with the second press plate via the axially operating pull element; and
at least one spring element, the at least one spring element being between an end of the axially operating pull element and the second press plate, the at least one spring element being compressed, having a predetermined preload when the second clutch is open, and the at least one spring element elastically deforming when the second clutch is closed wherein the at least one spring element are compressed coil springs, the coil springs being supported at the second press plate and at the axially operating pull element, wherein the coil springs are disposed on the side of the second press plate facing away from the levers.

2. A clutch unit as recited in claim 1 wherein the first and second lever arrangements each includes a lever and the first clutch includes an additional axially operating pull element, the lever of the first clutch coupled with the respective first press plate through the additional axially operating pull element of the first clutch.

3. A clutch unit as recited in claim 2 wherein the levers of the first and second lever arrangements form two-armed levers.

4. A clutch unit as recited in claim 3 wherein the respective two-armed levers are coupled with the associated axially operating pull elements through a radial outer area and respective joint, the two armed levers pivotably supported at the housing, radially inside joint.

5. A clutch unit as recited in claim 1 wherein the axially operating pull element of the second clutch is moved by a limited amount against the effect of the coil springs in an axial direction, relative to the second press plate, when closing the second clutch.

6. A clutch unit as recited in claim 1 wherein the axially operating pull element of the second clutch includes an axial stop, the axial stop being on the side of the second press plate actuated by the axially operating pull element facing away from the coil springs, the axial stop operating with the second press plate limiting the unloading of the coil springs acting upon the axially operating pull element when opening the second clutch.

7. A clutch as recited in claim 1 wherein the first clutch, adjacent to the flywheel, forms a drive clutch for shifting a transmission, and the second clutch serves as a drive for ancillary equipment.

* * * * *